United States Patent
Rochberger et al.

(10) Patent No.: US 6,208,623 B1
(45) Date of Patent: Mar. 27, 2001

(54) METHOD OF COMBINING PNNI AND E-IISP IN AN ASYNCHRONOUS TRANSFER MODE NETWORK

(75) Inventors: Haim Rochberger, Netanya; Alexander Or, Nesher; Michael Gorokhovsky, Netanya, all of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/059,658

(22) Filed: Apr. 13, 1998

(51) Int. Cl.$^7$ .................................................. H04L 12/28
(52) U.S. Cl. ............................ 370/254; 370/395; 709/241
(58) Field of Search .................................... 370/254, 255, 370/256, 389, 390, 395, 408, 407; 709/241, 242, 239

(56) References Cited

U.S. PATENT DOCUMENTS

| | | | |
|---|---|---|---|
| 5,291,477 | 3/1994 | Liew | 370/54 |
| 5,361,256 | 11/1994 | Doeringer et al. | 370/60 |
| 5,420,862 | 5/1995 | Perlman | 370/85.13 |
| 5,455,865 | 10/1995 | Perlman | 380/49 |
| 5,483,536 | 1/1996 | Gunji et al. | 370/85.14 |
| 5,491,690 | 2/1996 | Alfonsi et al. | 370/60 |
| 5,495,479 | 2/1996 | Galaand et al. | 370/60 |
| 5,544,327 | 8/1996 | Dan et al. | 395/250 |
| 5,550,818 | 8/1996 | Brackett et al. | 370/60 |
| 5,566,014 | 10/1996 | Glance | 359/124 |
| 5,590,118 | 12/1996 | Nederlof | 370/218 |
| 5,600,638 | 2/1997 | Bertin et al. | 370/351 |
| 5,603,029 | 2/1997 | Aman et al. | 395/675 |
| 5,629,930 | 5/1997 | Beshai et al. | 370/396 |
| 5,649,108 | 7/1997 | Spiegel et al. | 395/200.12 |
| 5,673,263 | 9/1997 | Basso et al. | 370/396 |
| 5,781,529 * | 7/1998 | Liang | 370/218 |
| 5,831,975 * | 11/1998 | Chen | 370/256 |
| 5,940,396 * | 8/1999 | Rochberger | 370/408 |
| 6,061,736 * | 5/2000 | Rochberger | 709/241 |
| 6,115,752 * | 9/2000 | Joens | 370/390 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

(List continued on next page.)

*Primary Examiner*—Douglas Olms
*Assistant Examiner*—Ricardo M. Pizarro
(74) *Attorney, Agent, or Firm*—Howard Zaretsky; David J. Weitz; Wilson Sonsini Goodrich & Rosati (57) ABSTRACT

A method of permitting older networks based on E-IISP routing to operate in newer PNNI based networks. The invention combines the PNNI and E-IISP routing schemes and permits their simultaneous execution in the same ATM network. The E-IISP routing scheme is modified so as to operate in unison with the minimal PNNI implementation configured on each node. The Hello protocol and associated Finite State Machine (FSM) are utilized to determine whether a remote node is in the same peer group. If it is determined that both nodes are in the same peer group, the ports on either side of the link are configured as standard PNNI type ports. If it is determined that the two nodes are from different peer groups, the ports on either of the link are configured as E-IISP type ports. Foreign address information is then exchanged between the two nodes thus permitting border nodes to learn about other peer groups from their respective remote nodes. Relatively large networks can be constructed that do not have any hierarchy as in networks running the full PNNI standard. Via the Hello protocol, changes made to links between nodes will be detected immediately and the port configuration modified appropriately.

10 Claims, 6 Drawing Sheets

OTHER PUBLICATIONS

Williams, K. A., "A Disturbed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

* cited by examiner

METHOD OF COMBINING PNNI AND E-IISP IN AN ASYNCHRONOUS TRANSFER MODE NETWORK

FIELD OF THE INVENTION

The present invention relates generally to data communication networks and more particularly relates to the construction of ATM networks that combine the use of two routing schemes.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, telephony, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as Interim Inter-Switch Signaling Protocol (IISP). The goal of the PNNI specifications is to provide customers of ATM network equipment some level of multi-vendor interoperability.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 PNNI based solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

A disadvantage of this scheme is that all the prefixes of all neighboring nodes must be registered manually on each of the respective ports. For example, if a port is disconnected from a neighbor and connected to a new neighbor, then the registered addresses must be manually changed in both nodes. This type of network can be termed an absolutely static network.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and the status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets which contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes its topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that were originated or received at the level of the logical group node or at higher levels are included in the database summary. The PTSP and PTSE header information of each such PTSE is listed in one of the nodes database packets. PTSE's for which new instances are received after the exchanging state has been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

IISP is a method of routing and performing auto registration (auto configuration) in an ATM network. The method simplifies the configuration and routing for ATM networks having a relatively large number of nodes. Networks are constructed in hierarchical fashion in the form of branches and trees and assigned network address prefixes in accordance with their location in the network. Network nodes periodically exchange identification information permitting both switches on either side of a link to be aware of who they are connected to. Each node registers a network address and an associated significant length for each of its neighbors on each of its links. A node performs routing by comparing the destination address against each of its registered addresses for all its links. The routing method takes advantage of the network address prefix to ensure that the routing proceeds in the correct direction towards the destination and does not enter a tree or a branch that does not contain the destination. In addition, each node performs load balancing at each point in the routing process. A node can generate crankback messages if the routing leads to a dead end.

In the address prefix exchange method, each node knows who its neighbors are. This is accomplished by each node sending out on all its NNI ports an identification message that comprises the address prefix assigned to it and its significant length. This message is sent out periodically (e.g., every second). The nodes that receive it compare the address prefix in the message to the special NNI type address that is registered on the port the message was received on. If the addresses do not match or there is no NNI address registered, then the node makes the received address prefix the new registered NNI address for that port and changes its routing tables accordingly. If the address do match, the message is ignored.

Each node sending out identification messages on a periodic basis automatically permits the node to almost immediately detect if it becomes connected to a new neighbor. If a change is detected, the nodes modifies its routing tables accordingly. In addition, since each node address prefix is unique and is assigned in hierarchical fashion as described above, it is guaranteed that either the local address prefix (i.e., the address prefix of the node itself) or the remote node address prefix will be smaller.

The IISP signaling specification requires that one side of a link be denoted as the USER and the other side as the NETWORK. In networks constructed in accordance with the present invention, on NNI links, if the significant length of the local prefix (i.e., of the node itself) is shorter than that of a neighbor, then the local side is set as the NETWORK. This particular link attribute setting allows the signaling to automatically align after a dynamic link replacement when a node's neighbors are changed.

Thus, the automatic exchange of network address prefixes causes the routing tables of each node to be updated and permits the signaling to 'come up'. This is in contrast to IISP Phase 0 which requires that link attributes to be set manually. This method is thus especially advantageous in large networks having more than two nodes.

As an alternative to the automatic exchange of network addresses, the transfer of addresses can be performed manually at each node or can be performed in accordance with ILMI registration procedures.

Note that the above described PNNI and IISP routing schemes are inherently different. In PNNI, only full address matching is permitted, i.e., an address must fully match the address entry in the topology database. In contrast, IISP permits partial address matching. The IISP routing method is a partially static routing scheme.

In addition, there are many ATM switches currently in operation that support only the IISP type routing. It is desirable to permit the owners of many of these older ATM switches to upgrade their switches to the more modern PNNI type routing. Upgrades can be performed by upgrading the operating software within the switches. In order to permit upgraded nodes to operate in a PNNI network, the upgraded switches can only support a minimal PNNI configuration. This means that the hierarchical features of PNNI are not supported. More specifically, in a minimal subset of PNNI, a node cannot function as a border node or as a Peer Group Leader (PGL). A border node is a node that has a link to another peer group and executes a special finite state machine (FSM). The PGL is the node that represents the whole peer group and functions as the key component for building large hierarchical networks.

A conflict exists, however, since a major benefit of PNNI is its ability to permit network designers to construct large hierarchical networks. Using PNNI, networks can be constructed that comprise peer groups having from dozens to over a hundred nodes. The concept is that many nodes in the same peer group can be represented as one node in a higher level of the hierarchy. Since PNNI utilizes a link state, source routing type routing scheme wherein each node has a view of the entire network, it is the hierarchy that permits the division of the network view into smaller chunks. In PNNI, very large portions of the network comprising a large number of nodes may be viewed by nodes in other peer groups as a single logical node.

A limitation of the older ATM switches currently in use is that they cannot support large PNNI networks. If the nodes in a network only support a minimal PNNI implementation, large hierarchical networks cannot be constructed. Thus, all the nodes in such a network will be at the same peer level. This causes each node in the peer group to include the whole peer in its network topology database, including nodal, link and addressing information.

The amount of memory each switch contains, however, is limited and typically is insufficient to hold the required data structures to support networks comprising hundreds of nodes. The limited memory capacity of these nodes will quickly be exhausted once the peer group grows beyond a relatively small size. Thus, these older upgraded nodes are limited to smaller groups of approximately fifty nodes or less.

SUMMARY OF THE INVENTION

The present invention provides a solution to permit older networks based on IISP routing to operate in newer PNNI based networks. The invention is a method which combines the PNNI routing scheme with an enhanced version of the IISP routing scheme which permits their simultaneous execution in the same ATM network. The IISP routing scheme is modified so as to operate in unison with the minimal PNNI implementation configured on each node. The modified IISP is termed enhanced IISP or E-IISP.

In the present invention, it is assumed that nodes are configured with a minimal PNNI implementation and they (1) cannot function as border nodes and (2) cannot function as peer group leaders.

The method of the present invention utilizes the Hello protocol and associated Finite State Machine (FSM) to determine whether a remote node is in the same peer group. The peer group IDs are exchanged and examined. The addresses and levels are exchanged via the Hello protocol. If it is determined that both nodes are in the same peer group, the ports on either side of the link are configured as standard PNNI type ports. The Hello protocol, associated FSM and PTSE FSM continue in accordance with the standard.

If it is determined, however, that the two nodes are from different peer groups, the ports on either side of the link are configured as E-IISP type ports. This means that the two nodes are actually border nodes residing in different peer groups. Foreign address information is then exchanged between the two nodes. Via this mechanism, border nodes learn about other peer groups from their respective remote nodes.

Thus, the nodes within a peer group are connected by links of the PNNI type and border nodes between peer groups are connected by links of the E-IISP type. Since each node eventually learns about the address prefixes of other peer groups in the network using ILMI in combination with the method of the present invention, a source user connected to a source node can be routed to a destination user connected to a destination node anywhere in the network.

In this fashion, relatively large networks can be constructed that do not have any hierarchy as in networks running the full PNNI standard as opposed to the minimal PNNI implementation. To prevent switches from exceeding their limited memory capacity, it is recommended that the number of nodes placed in each peer group be limited. For example, the number of nodes in a peer group can be limited to 50 so as not to exceed the memory capacity of the switches.

In addition, since the Hello protocol is always running, changes made to links between nodes will be detected immediately. In response to links being disconnected and reconnected to form different network configurations, a node may switch the port configuration type from PNNI to E-IISP and vice versa. When a port type is changed from E-IISP to PNNI, the locally registered addresses must be flushed from the topology database.

There is provided in accordance with the present invention, in an Asynchronous Transfer Mode (ATM) network having a plurality of nodes, the plurality of nodes configured to form one or more peer groups connected by one or more links, each node having a topology database and being capable of configuring each of its ports as either a Private Network Node Interface (PNNI) type port or an Enhanced Interim Inter-Switch Signaling Protocol (E-IISP) type port, a method of building ATM networks combining both PNNI and E-IISP schemes, the method comprising the steps of determining, on each node connected to a remote node via a link, whether the node and its remote node are from the same peer group, configuring the port associated with the link as a PNNI type port if the node and its remote node are from the same peer group, configuring the port associated with the link as an E-IISP type port if the node and its remote node are not from the same peer group, transferring from the node to the remote node, all foreign addresses in the topology database of the node, registering the foreign addresses received by the remote node in the topology database of the remote node and flooding the foreign addresses from the remote node to other nodes that are members of the peer group of the remote node.

The step of determining comprises the steps of executing a Hello protocol and associated Finite State Machine (FSM) of PNNI on each port configured as a non User to Network Interface (UNI) port and extracting a peer group ID from Hello messages received from a remote node located on the other side of the link each port is connected to.

The method further comprises the step of executing a conventional Hello protocol and PNNI Topology State Element (PTSE) Finite State Machines (FSMs) of PNNI. The method further comprises the step of executing a conventional Hello protocol and PNNI Topology State Elements (PTSE) Finite State Machines (FSMs) of PNNI on each port regardless of whether the port is configured as a PNNI type port or an E-IISP type port. The method further comprises the step of changing the configuration of a port from a PNNI type port to an E-IISP type port in response to one or more changes to the configuration of the network. The method further comprises the step of changing the configuration of a port from an E-IISP type port to a PNNI type port in response to one or more changes to the configuration of the network. The method further comprises the step of transferring and registering the foreign addresses from the node to the remote node utilizing the Interim Local Management Interface (ILMI) protocol.

The method further comprises the step of transferring from the remote node to the node, all foreign addresses in the topology database of the remote node. The method further comprises the step of registering foreign addresses, received by the node from the remote node, in the topology database of the node. The method further comprises the step of transferring and registering the foreign addresses from the remote node to the node utilizing the Interim Local Management Interface (ILMI) protocol.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DS | Database Summary |
| DTL | Designated Transit List |

-continued

| Term | Definition |
| --- | --- |
| E-IISP | Enhanced Interim Inter-Switch Signaling Protocol |
| FDDI | Fiber Distributed Data Interface |
| FSM | Finite State Machine |
| IISP | Interim Inter-Switch Signaling Protocol |
| ILMI | Interim Local Management Interface |
| ITU | International Telecommunications Union |
| NNI | Net to Network Interface |
| OSPF | Open Shortest Path First |
| PGL | Peer Group Leader |
| PNNI | Private Network to Network Interface |
| PTSE | PNNI Topology State Element |
| PTSP | PNNI Topology State Packet |
| RCC | Routing Control Channel |
| SVC | Switched Virtual Circuit |
| UNI | User to Network Interface |
| VCC | Virtual Channel Connection |

General Description

Figure 1:
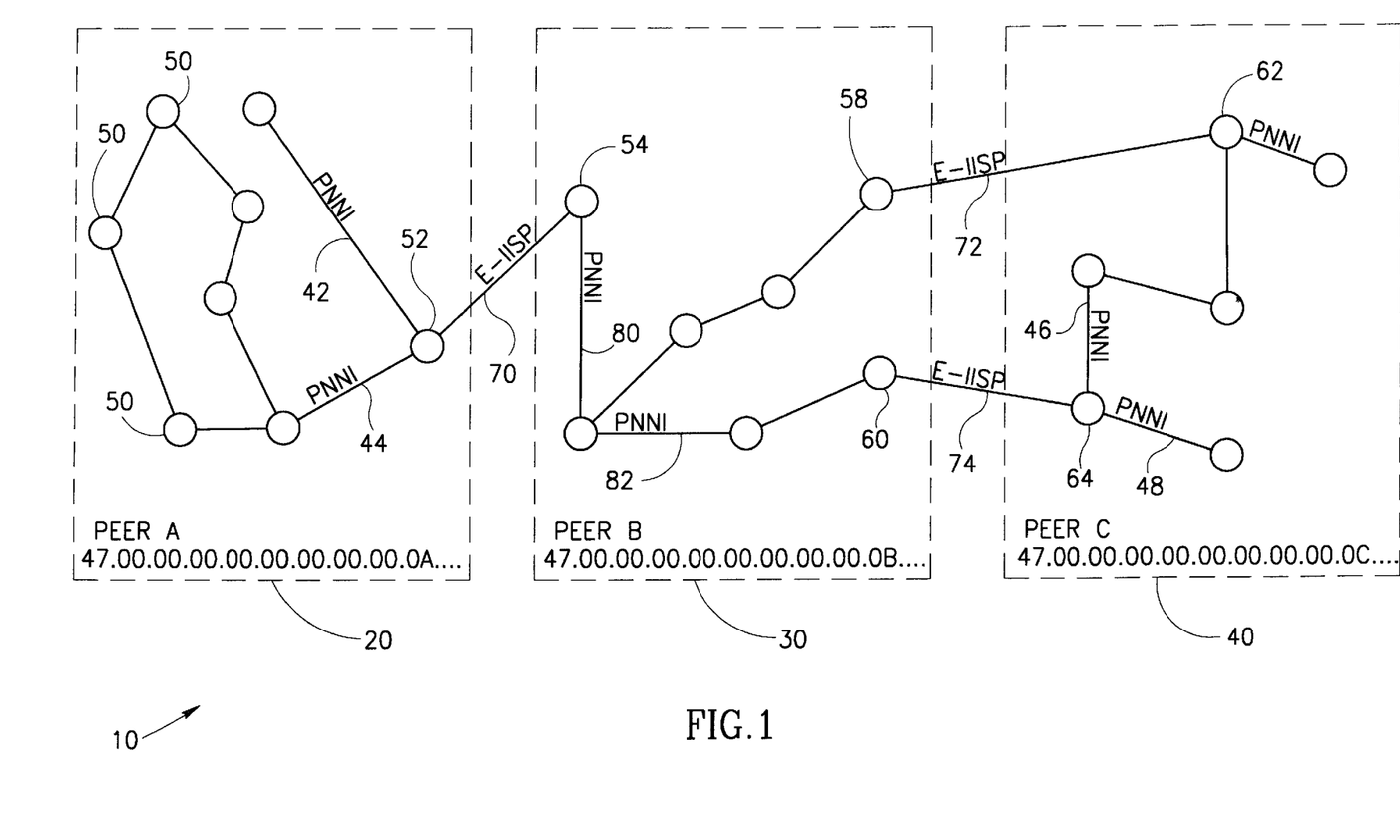
FIG. 1 is a diagram illustrating an example ATM network having three peers wherein all nodes are running a minimal PNNI implementation.

A diagram illustrating an example ATM network having three peers wherein all nodes are running a minimal PNNI implementation is shown in FIG. 1. The example network shown in FIG. 1 is presented for illustrative purposes only. ATM networks having an unlimited number of configurations are also within the scope of the present invention. In addition, to aid in the understanding principles of the present invention, the following description uses a PNNI level of 80 as an example. This in no way is meant to limit the scope of the present invention, as any PNNI level may be used with the invention. In addition, each link on each node is configured to be either a UNI port or a non-UNI port. Non-UNI ports may function either as a PNNI port or as an E-IISP port. It is thus assumed that each node in the network can configure its ports in accordance with the PNNI standard and in accordance with the E-IISP. Details of the PNNI protocol standard can be found in ATM Forum PNNI-1 Specification, incorporated herein by reference. Details of E-IISP can be found in U.S. patent application Ser. No. 08/697,220, entitled A METHOD OF ROUTING IN AN ASYNCHRONOUS TRANSFER MODE NETWORK, now U.S. Pat. No. 5,940,396, and incorporated herein by reference in its entirely. More information on ATM networks can be found in the book ATM: The New Paradigm for Internet, Intranet and Residential Broadband Services and Applications, Timothy Kwok, Prentice Hall, 1998.

It is important to note that the method of the present invention utilizes only the auto registration features of E-IISP. The routing features of PNNI are utilized rather than those of E-IISP.

Referring to FIG. 1, the ATM network, generally referenced 10, comprises three peer groups labeled Peer A 20, Peer B 30 and Peer C 40. Each peer group comprises a plurality of nodes 50 each connected by links. Each peer group also comprises one or more border nodes that connect one peer group to another. Peer A comprises a single border node 52 that is connected to neighboring nodes via PNNI links 42 and 44. Peer B comprises three border nodes. Border node 54 is connected to border node 52 in Peer A via E-IISP link 70. Node 54 is also connected to its neighboring node via PNNI link 80. Node 58 is also a border node connected to border node 62 in Peer C via E-IISP link 72. Likewise, border node 60 is connected to border node 64 in Peer C via E-IISP link 74. Node 64 is connected to its neighboring nodes via PNNI links 46, 48.

Each peer group is assigned a peer group ID which consists of a 14 byte ID. The ID comprises 1 byte indicating the PNNI level in bits followed by 13 bytes indicating the address prefix up to the level number of bytes. In connection with addresses, the term significant length refers to number of valid bits of address prefix for a node configured originally. The significant length of an address prefix is less then or equal to 13 bytes (104 bits). The term PNNI level refers to the number of bits which defines the level of the node in the PNNI hierarchy. The PNNI level is also less than or equal to 13 bytes. Typically the PNNI level is less than or equal to the significant length.

Address prefixes consist of 13 bytes. Note that all nodes in the same peer group have the same PNNI level and thus the address prefix of each node up to the PNNI level number of bits is the same. The bits following the PNNI level number of bits until the significant length are unique for each node. The bits following the significant number of bits are padded with zeros and not used. During the network setup stage, a 20 byte destination address is assigned. The 20 byte addresses is made up of a 13 byte address prefix following by the 6 byte MAC address followed by a 1 byte selector field.

In the example presented herein to illustrate the method of the present invention, all the nodes in each peer have a PNNI level of 80, i.e., 10 bytes, in their PNNI configuration. Thus, the first 10 bytes of the prefix for each node in a peer group is common. The remaining 3 bytes are unique for each node within the peer group. All nodes in the network have the same 9 most significant bytes in their node address prefixes. In addition, each peer group has a peer group ID that is unique in the 10$^{th}$ byte of their prefix. All the nodes within the same peer have the same 10$^{th}$ byte in their node address prefix. Thus, the first 10 bytes of the address assigned to Peer A is 47.00.00.00.00.00.00.00.00.0A. The first 10 bytes assigned to Peer B is 47.00.00.00.00.00.00.00.00.0B. The first 10 bytes assigned to Peer C is 47.00.00.00.00.00.00.00.00.0C. The actual 14 byte peer group ID assigned to each peer group is shown in Table 1 below:

TABLE 1

| Peer Group | Peer Group ID |
|---|---|
| A | 80.47.00.00.00.00.00.00.00.00.0A.00.00.00 |
| B | 80.47.00.00.00.00.00.00.00.00.0B.00.00.00 |
| C | 80.47.00.00.00.00.00.00.00.00.0C.00.00.00 |

Referring to FIG. 1, each node in the network supports ports that can be either PNNI ports or E-IISP ports. Each node that has a port configured as a non-UNI port, runs the Hello protocol and associated FSM of the PNNI standard at all times regardless of whether it is configured as a PNNI port of an E-IISP port.

In operation, when a node receives the Hello message from a remote node, it examines the addresses to determine whether both node are in the same peer group or not. If the node determines that both nodes are in the same peer group then it configures that port as a PNNI type port. The regular Hello protocol, associated FSM and PTSE FSM are followed as if the link was a standard PNNI link. Note that in this example, two nodes will be in the same peer group if the two nodes are configured to have the same unique ID in the 10$^{th}$ byte of their address prefix. In addition, since both nodes have the same PNNI level of 80, they are both at the same peer group level. Note that the peer group ID is extracted from the network prefix and level. Thus, the links between the nodes within each peer group are configured as PNNI links.

When a node receives a Hello message from a remote node and determines that both nodes are from different peer groups, the node configures the port as an E-IISP type port. Information is then exchanged between the nodes. Such information includes but is not limited to an ILMI trap including all the foreign addresses that are in the remote node's topology database. This exchange occurs in both directions with each node exchanging foreign addresses. Each node than registers these addresses on its respective side of the E-IISP port and subsequently floods the addresses to the nodes within its peer group.

Thus, after the Hello protocol is run on the network 10, it will comprise three E-IISP links 70, 72, 74. Each E-IISP link connects one peer group with another. Peers B and C have two E-IISP links connecting them together.

Figure 2A:
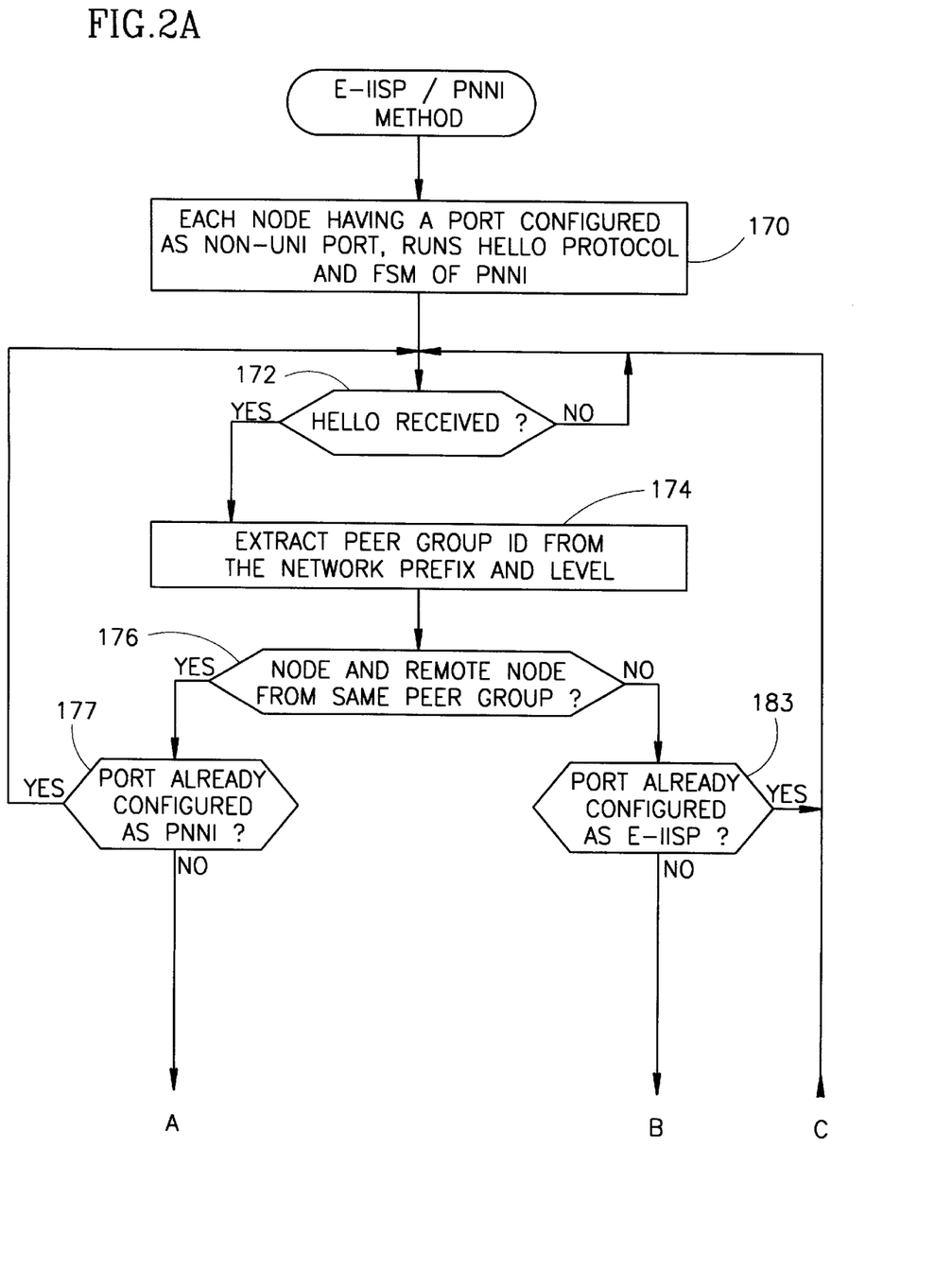
FIGS. 2A and 2B are a logical flow diagram illustrating the combined routing scheme method of the present invention.
Figure 2B:
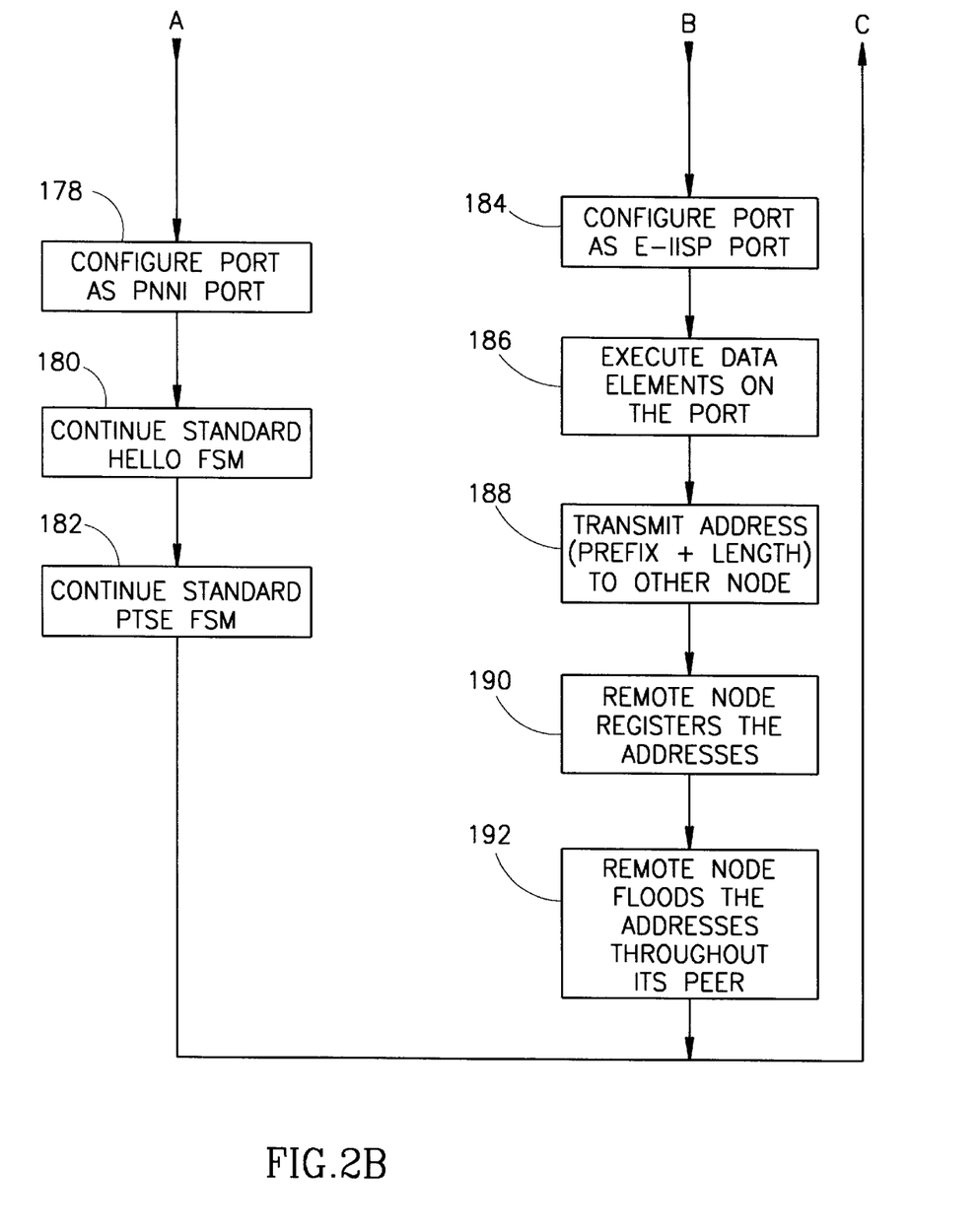

A logical flow diagram illustrating the combined routing scheme method of the present invention is shown in FIGS. 2A and 2B. The first step is that each node having a port configured as a non-UNI port runs the Hello protocol and associated FSM in accordance with the PNNI standard (step 170). When a Hello message is received (step 172) the peer group ID is extracted from the network prefix and level (step 174). It is then determined whether the node and remote node are from the same peer group (step 176).

If both nodes are from the same peer group, they both configure their ports as PNNI type ports (step 178). Processing continues with the Hello protocol and associated FSM in accordance with the PNNI standard (step 180). Also, PNNI standard PTSE FSM handling is also performed (step 182).

If it is determined that both nodes are, however, from different peer groups, the corresponding ports in both nodes are configured as E-IISP ports (step 184). Even though the port is configured as E-IISP, it retains PNNI functionality, e.g., the Hello protocol and FSM continues to run. One or more data elements are then exchanged between the ports (step 186). Data is exchanged via ILMI protocol which is commonly used to exchange information between two nodes. One of the data elements exchanged includes the addresses of other known border nodes (step 188). Each side sends the prefix plus the PNNI level (length) of its nodal address. Data can be exchanged via one of two ways (1) via peer group IDs in the Hello protocol messages or (2) via ILMI protocol method.

Thus, the ports connecting nodes 52, 54 (via link 70) are configured as E-IISP ports. Node 52 then sends to node 54 any knowledge it has of other border nodes. Likewise, node 54 sends to node 52 any knowledge it has of other border nodes such as nodes 58, 60.

Once a node learns the addresses from its remote node, it first registers the address in its topology database (step 190). The node then floods the addresses throughout its peer (step 192). The node packages the address, indicating that the address is a local reachable address, into a PTSE and floods this PTSE to nodes within its peer group. In one embodiment, the node floods two PTSEs: one PTSE contains the actual address as a standard PTSE, the second non-mandatory PTSE contains data indicating that that particular address is an E-IISP address. The address can be tagged as an E-IISP address by setting one or more flags in the PTSE. Nodes that are programmed to implement the method of the present invention will receive and process the foreign address information accordingly. Nodes that do not implement the method of the present invention, however, will receive the PTSE which is considered unknown, store it, flood it and age it but will otherwise ignore it.

Using the method of the present invention, a network designer can build very large networks that do not have any hierarchy. Relatively small PNNI peer groups of, for example, 50 nodes or less, are connected together via E-IISP type links.

Figure 3:
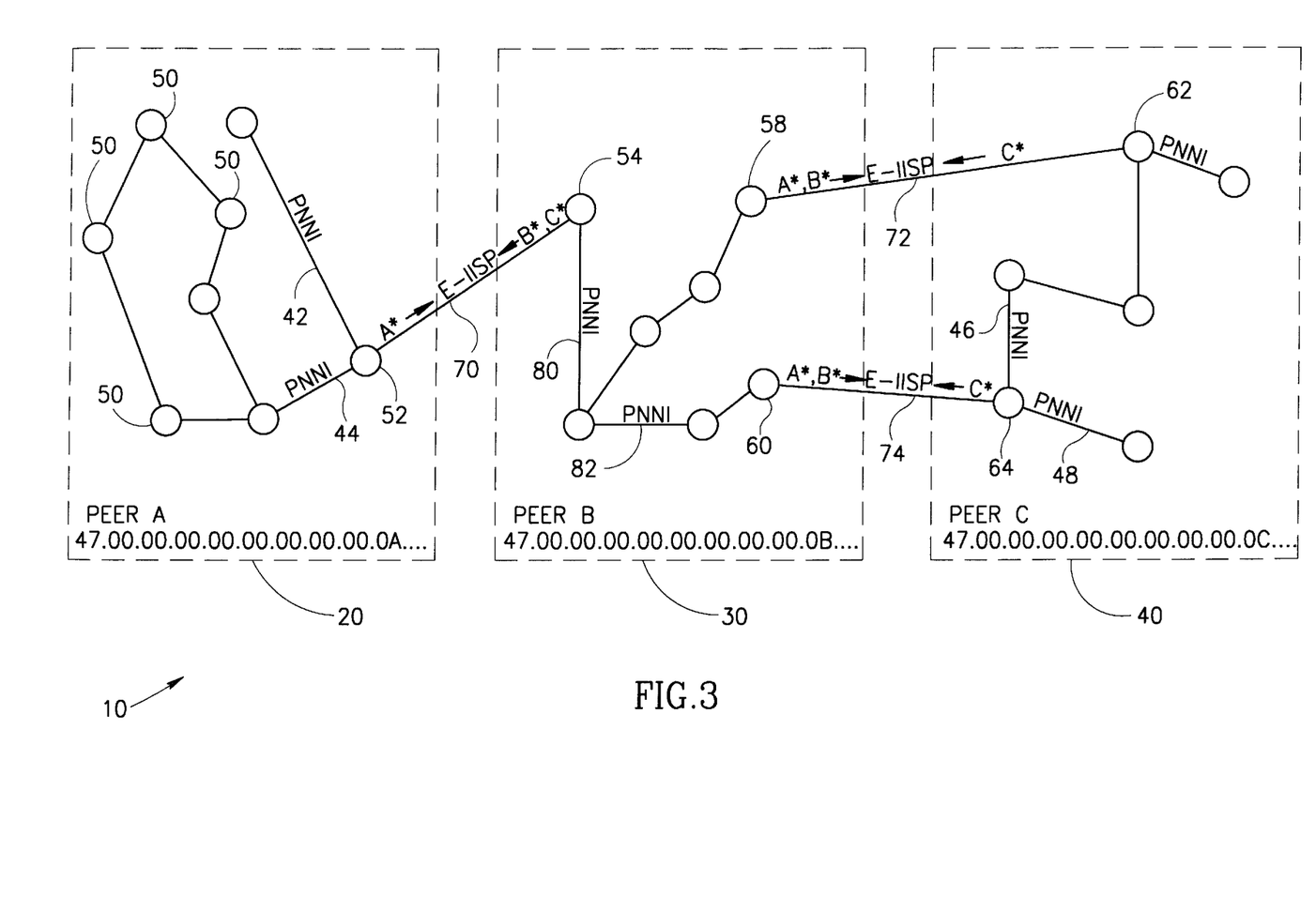
FIG. 3 is a diagram illustrating an example ATM network having three peers and the address exchanges between the border nodes.

A diagram illustrating an example ATM network having three peers and the address exchanges between the border nodes is shown in FIG. 3. The three peer groups A, B, C are connected together via links 70, 72, 74. Using the method of FIGS. 2A and 2B, the links connecting nodes within the peer groups are configured as PNNI type links. The links connecting the border nodes 52 and 54; 58 and 62; 60 and 64 are configured as E-IISP type links.

After the exchange of Hello messages each of the border nodes configure their ports as E-IISP ports. In addition, each of the border nodes learns of the existence of the other peer groups since the foreign addresses are exchanged during the E-IISP configuration using the ILMI protocol. Thus, node 54 learns about Peer A via node 52 and node 52 learns about Peers B and C via node 54. Likewise, node 62 learns about Peers A and B from node 58 and node 58 learns about Peer C from node 62. A similar learning occurs between nodes 60, 64 connecting Peers B and C. Note that in FIG. 3, A*, B* and C* represent the full peer group ID for each peer group as shown in Table 1 above.

In accordance with the present invention each node registers what it learns from the remote node, i.e., its remote peer, on the other side of the E-IISP link. Once registered, they are flooded throughout the entire PNNI portion of the network 10 thus permitting every destination to be reached.

Figure 4:
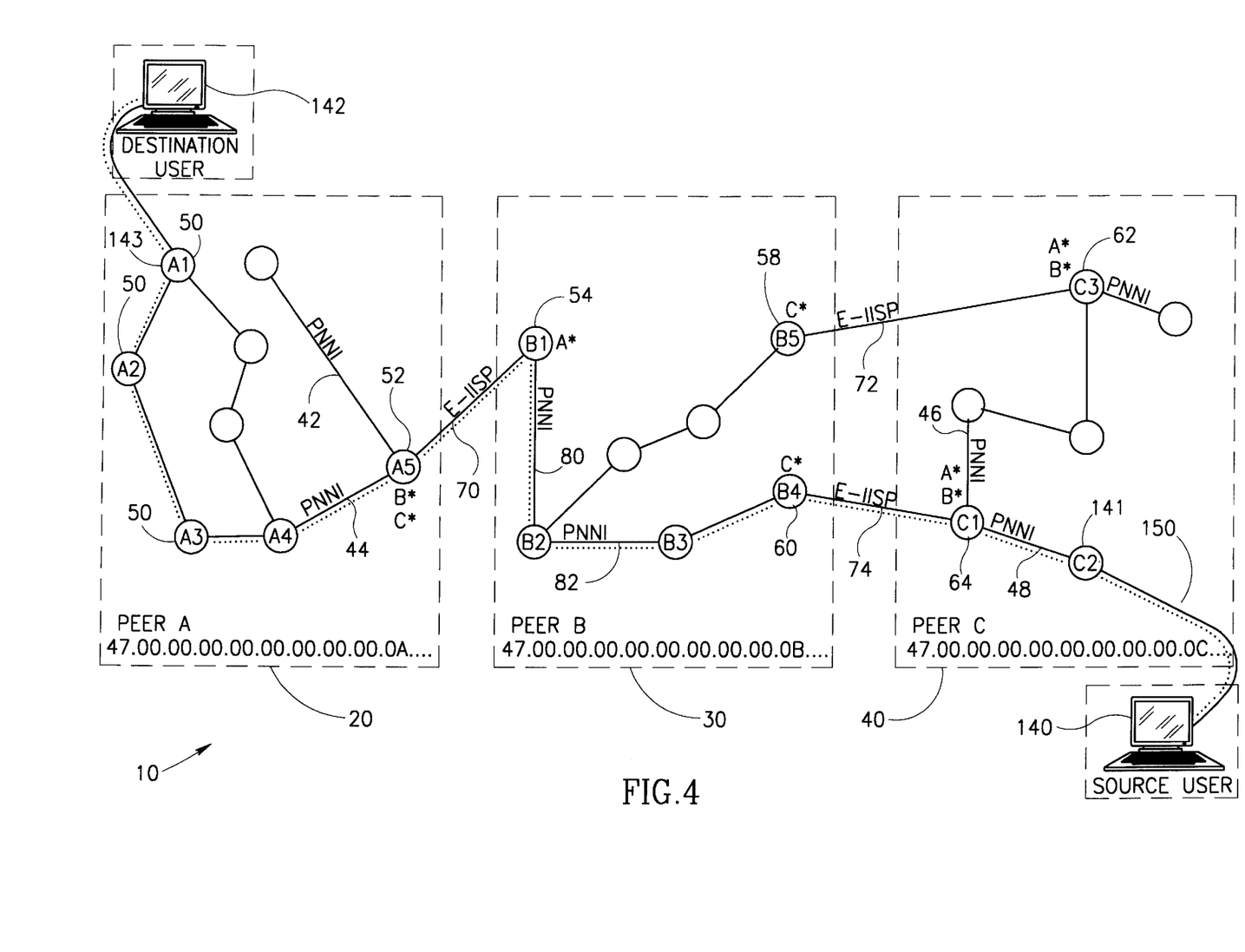
FIG. 4 is a diagram illustrating an example ATM network and the route chosen from a source user to a destination user.

A diagram illustrating an example ATM network and the route chosen from a source user to a destination user is shown in FIG. 4. A source user 140 is connected to a source node 141 and a destination user 142 is connected to a destination node 143. Once the addresses of the foreign peers have been exchanged, registered and flooded, when the source user 140 sets up a call to the destination user 142, the network will be able to route the call via the various peer groups. Note that at this point, nodes 62, 64 have addresses A*, B* registered; nodes 58, 60 have address C* registered; node 54 has address A* registered and node 52 has addresses B*, C* registered. The addresses registered by each node is summarized in Table 2 presented below. The route established for the call is shown in FIG. 4 as the dotted line referenced 150.

TABLE 2

| Node (Ref. Num.) | Peer Group ID(s) Registered |
|---|---|
| A5 (52) | B*,C* |
| B1 (54) | A* |
| B5 (58) | C* |
| B4 (60) | C* |
| C3 (62) | A*,B* |
| C1 (64) | A*,B* |

In the example shown in FIG. 4, the source node establishes a SVC call to the destination by the following steps. The originating node (source node), that the source user is attached to, determines the best match to the destination address that begins with A*, which will cause it to choose node C1 64. Note that the border node in each peer is also a terminating node for that particular call, i.e., the node is the last node in the Designated Routing List (DTL). For example, node 52 is a terminating for all A* destination addresses.

Although node 62 also is registered with address A*, node C1 64 is chosen since node 64 is less costly than node 62.

The DTL used for PNNI routing would include the following nodes (C2, C1). Node C1 realizes it is the last node in the DTL, thus local routing must be utilized. In other words, the call is routed to either a UNI port, E-IISP port or IISP port. All three cases are non PNNI domain ports. Thus, node C1 routes the call to node Peer B over link 74 without a DTL.

At border node B4 60 of Peer B, the call is handled as if a user directly connected to the node had requested the call. Thus, node B4 functions as if it was the originating (source) node. It thus performs a best match on the destination address (A*) which results in node B1 54 being chosen. A DTL is constructed comprising the nodes (B4, B3, B2, B1). The call is routed to node B1 which realizes it is the last node in the DTL and thus routes the call locally to node A5 in Peer A over link 70.

At border node A5 52 of Peer A, the call is handled as if a user directly connected to the node had requested the call. Thus, node A5 functions as if it was the originating (source) node. It thus performs a best match on the destination address (A*) which results in node A1 143 being chosen. A DTL is constructed comprising the nodes (A5, A4, A3, A2, A1). The call is then routed using standard PNNI routing to node A1 143 to which the destination user is attached.

It is an important aspect of the present invention that the ports on each node in the network that are configured as non-UNI ports, can change from PNNI type port to E-IISP port and vice versa. The main difference being that on a port configured as PNNI port, the standard PNNI protocol is active. While on the E-IISP ports, there is only an ILMI protocol that sends traps which include the foreign addresses learned by the node and stored in its PNNI topology database. The E-IISP port also functions to register any address that it receives from the remote node using the same mechanism. The node subsequently floods the foreign addresses to the other nodes in its peer group.

It is also important to note that the PNNI Hello protocol and associated FSM mechanism that is used to determine which type of port the port should be configured to. The Hello protocol mechanism is used since it is assumed that the nodes in the network support only the minimal PNNI subset implementation which does not support border nodes.

Figure 5:
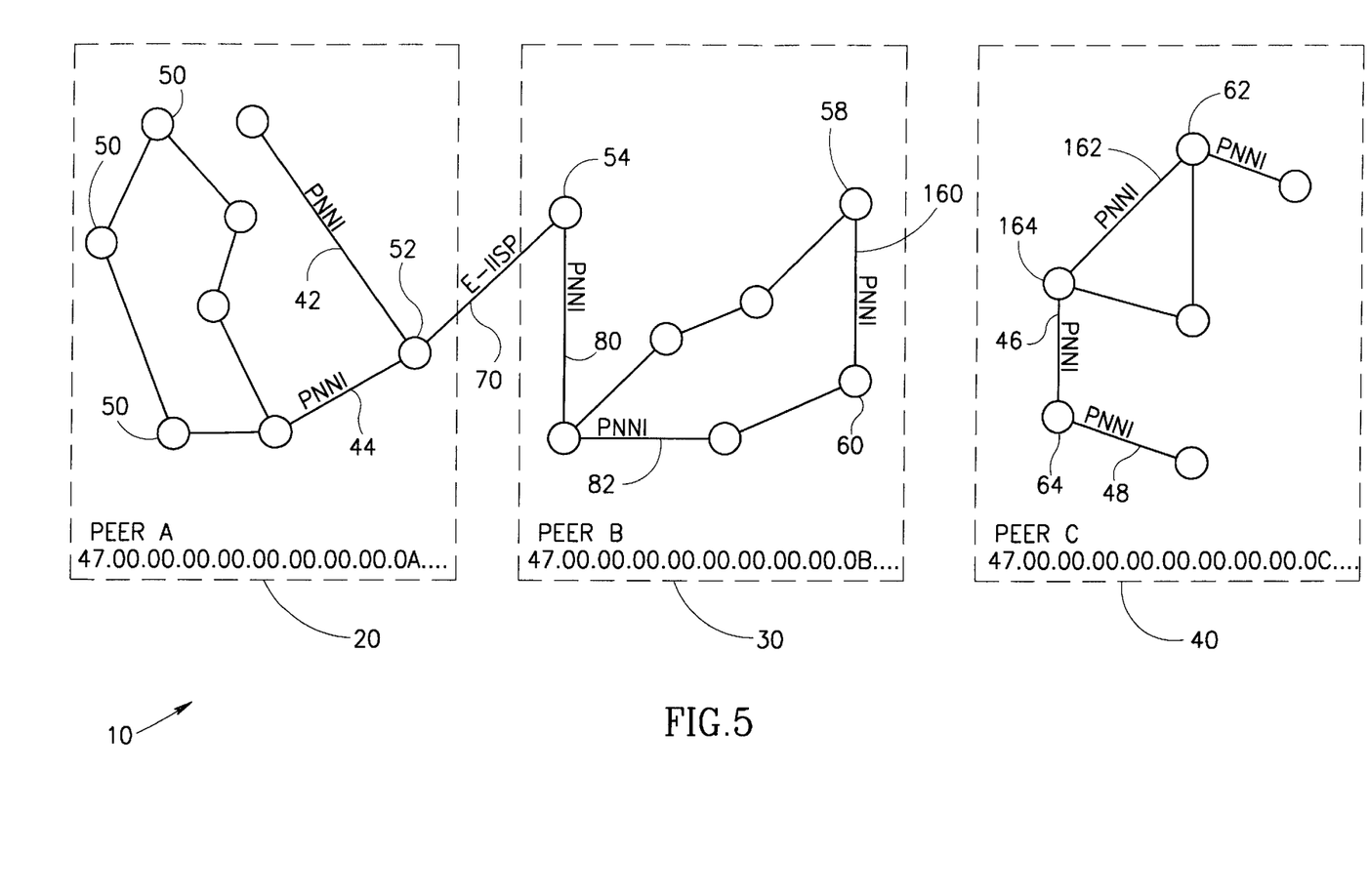
FIG. 5 is a diagram illustrating an example ATM network with a portion of the links disconnected.

A diagram illustrating an example ATM network with a portion of the links disconnected is shown in FIG. 5. In this example, the links between Peers B and C are disconnected. The E-IISP link 70 connecting nodes 52, 54 remains intact. In particular, with reference to FIGS. 1 and 5, links 72, 74 are disconnected. Node 62 is reconnected to node 164 via link 162. Node 58 is reconnected to node 60 via link 160. Thus, links 160, 162 represent the new connections. Via the Hello protocol and FSM, the nodes determine that the nodes on either side of the link are from the same peer group. Thus, they configure their ports as PNNI type ports as indicated in FIG. 5.

Once the ports are re-configured as PNNI ports, the locally registered addresses are flushed from the topology database and corresponding PTSEs are flooded to the nodes within the peer group.

While the invention has been described with respect to a limited number of embodiments, it will be appreciated that many variations, modifications and other applications of the invention may be made.

What is claimed is:

1. In an Asynchronous Transfer Mode (ATM) network having a plurality of nodes, said plurality of nodes configured to form one or more peer groups connected by one or more links, each node having a topology database and being capable of configuring each of its ports as either a Private Network Node Interface (PNNI) type port or an Enhanced Interim Inter-Switch Signaling Protocol (E-IISP) type port, a method of building ATM networks combining both PNNI and E-IISP schemes, said method comprising the steps of:

determining, on each node connected to a remote node via a link, whether the node and its remote node are from the same peer group;

configuring the port associated with the link as a PNNI type port if said node and its remote node are from the same peer group;

configuring the port associated with the link as an E-IISP type port if said node and its remote node are not from the same peer group;

transferring from the node to the remote node, all foreign addresses in the topology database of the node:

registering said foreign addresses received by the remote node in the topology database of the remote node; and flooding said foreign addresses from the remote node to other nodes that are members of the peer group of the remote node.

2. The method according to claim 1, wherein said step of determining comprises the steps of:

executing a Hello protocol and associated Finite State Machine (FSM) of PNNI on each port configured as a non User to Network Interface (UNI) port; and extracting a peer group ID from Hello messages received from a remote node located on the other side of the link each port is connected to.

3. The method according to claim 1, further comprising the step of executing a conventional Hello protocol and PNNI Topology State Elements (PTSE) Finite State Machines (FSMs) of PNNI.

4. The method according to claim 1, further comprising the step of executing a conventional Hello protocol and PNNI Topology State Elements (PTSE) Finite State Machines (FSMs) of PNNI on each port regardless of whether the port is configured as a PNNI type port or an E-IISP type port.

5. The method according to claim 1, further comprising the step of changing the configuration of a port from a PNNI type port to an E-IISP type port in response to one or more changes to the configuration of the network.

6. The method according to claim 1, further comprising the step of changing the configuration of a port from an E-IISP type port to a PNNI type port in response to one or more changes to the configuration of the network.

7. The method according to claim 1, further comprising the step of transferring and registering the foreign addresses from the node to the remote node utilizing the Interim Local Management Interface (ILMI) protocol.

8. The method according to claim 1, further comprising the step of transferring from the remote node to the node, all foreign addresses in the topology database of the remote node.

9. The method according to claim 1, further comprising the step of registering foreign addresses, received by the node from the remote node, in the topology database of the node.

10. The method according to claim 1, further comprising the step of transferring and registering the foreign addresses from the remote node to the node utilizing the Interim Local Management Interface (ILMI) protocol.

* * * * *